(12) United States Patent
Bradley et al.

(10) Patent No.: US 8,196,726 B2
(45) Date of Patent: Jun. 12, 2012

(54) INTERACTIVE PARASITIC DEVICES FOR ENGINE PERFORMANCE IMPROVEMENT

(75) Inventors: James C. Bradley, New Haven, IN (US); Rodney J. Klinger, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 510 days.

(21) Appl. No.: 12/503,094

(22) Filed: Jul. 15, 2009

(65) Prior Publication Data
US 2011/0011073 A1    Jan. 20, 2011

(51) Int. Cl.
*F16D 33/04* (2006.01)
(52) U.S. Cl. .......... 192/58.3; 192/82 T; 60/354
(58) Field of Classification Search ...... 192/58.1–58.43; 60/332, 354
See application file for complete search history.

(56) References Cited

U.S. PATENT DOCUMENTS

| | | | |
|---|---|---|---|
| 1,129,720 A * | 2/1915 | Patterson | 192/3.22 |
| 2,415,365 A * | 2/1947 | Mudd | 60/354 |
| 3,444,748 A | 5/1969 | Sutaruk | |
| 3,809,197 A | 5/1974 | Clancey | |
| 4,132,299 A | 1/1979 | Rohrer | |
| 4,437,554 A | 3/1984 | Haeck | |
| 4,519,373 A | 5/1985 | Hardy | |
| 4,526,257 A | 7/1985 | Mueller | |
| 6,711,896 B1 * | 3/2004 | Johnson | 60/363 |
| 2007/0000349 A1 * | 1/2007 | Maguire et al. | 74/718 |
| 2008/0118349 A1 | 5/2008 | Petitjean | |

FOREIGN PATENT DOCUMENTS
EP    1772608 A1    11/2007

OTHER PUBLICATIONS

Screen shot from www.hortoninc.com/products/products.asp showing VMASTER directly controlled fan drive, Nov. 22, 2005.
Screen shot from www.hortoninc.com/products/products.asp showing VMASTER air-sensing fan drive, Nov. 22, 2005.

* cited by examiner

*Primary Examiner* — Richard M. Lorence
(74) *Attorney, Agent, or Firm* — Jeffrey P. Calfa; Mark C. Bach

(57) ABSTRACT

A motor vehicle power take off system for a motor vehicle engine includes a viscous coupling. The input rotor of the viscous coupling is provided with a variable geometry impeller section which allows direct control over the proportion of input torque on the input shaft transferred to the viscous fluid and thereby to an output shaft. Both passive and active control schemes are proposed.

3 Claims, 6 Drawing Sheets

INTERACTIVE PARASITIC DEVICES FOR ENGINE PERFORMANCE IMPROVEMENT

BACKGROUND

1. Technical Field

The disclosure relates to viscous or shear fluid torque coupling devices and more particularly to a viscous coupling having a variably configurable input rotor allowing control over the transfer of power to an output rotor and to parasitic devices driven by the output rotor.

2. Description of the Problem

Fluid couplings using a viscous working fluid for transmitting torque from an input shaft to an output shaft are well known in the art. Such fluid couplings have typically included an output rotor and a cover which cooperate to define a fluid chamber, a valve plate dividing the fluid chamber into an operating chamber and a reservoir, and an input rotor disposed within the operating chamber and rotatable relative to an output rotor. The input and output rotors define a shear space such that rotation of the input rotor causes viscous fluid to circulate in the shear space and thereby exert a viscous drag on the output rotor, causing the output rotor to rotate. The valve plate defines a fill orifice, and a valving arrangement controls the flow of the working fluid from the reservoir chamber, through the fill orifice, into the operating chamber. When most of the viscous fluid is discharged from the operating chamber to the reservoir chamber the fluid coupling is considered to be "disengaged" and little or no power is transmitted through the device. When viscous fluid partially or fully fills the operating chamber, infiltrating the shear space, the coupling becomes partially or fully "engaged".

Conventional fluid couplings have exhibited relatively tight clearances between the outer periphery of the input member and the inner periphery of the output member, partly because the viscous fluid between these adjacent peripheries acts as a fluid bearing, and partly to maximize the available shear surface and the torque transmitting capacity. U.S. Pat. No. 4,132,299 taught such a fluid coupling. The '299 patent is also an example of a form of valving to control the flow of fluid into the operating chamber to effect engagement or disengagement.

Conventional fluid couplings have generally been of the type referred to as "full OD", i.e., the outer surface of the input member and the inner surface of the output member are cylindrical and have a maximum diameter over the entire axial extent of the respective surfaces. A full OD input member provides maximum torque transmission when the fluid coupling is engaged. With the coupling disengaged, however, several problems arise in connection with the use of the full OD input member. One of these is the "cold-start" condition which arises after the coupling has been inoperative for a period of time and fluid has leaked from the reservoir into the operating chamber, causing the coupling to operate as though it were engaged when it is intended to be disengaged. Upon start-up of the coupling under this condition, it typically takes a full minute or more for enough of the fluid to be discharged from the operating chamber back into the reservoir chamber to reduce the speed of the output member to its normal, disengaged level. During this period of time, operation of the coupling may not be desired, e.g., the coupling is driving the radiator cooling fan of a vehicle engine and no cooling is required upon initial start-up of the vehicle engine. A relatively higher disengaged output speed (referred to as "idle speed") results in a relatively higher horsepower consumption by the coupling and the associated cooling fan with no resultant benefit.

As the interest in improved fuel efficiency in motor vehicles has grown, with the increasing cost of transportation fuel, and the need to comply with emission regimes has been compelled by mandatory government standards, interest has grown in limiting power drawn by parasitic devices which are conventionally driven off the engine or vehicle transmission. Such devices include not a only engine cooling fans, which have routinely been equipped with viscous couplings, but power steering pumps, alternators, compressors, power take-off equipment and even engine superchargers. The ability to disengage such devices when not needed can substantially reduce power demands, thus reducing fuel consumption and potentially easing meeting emission requirements. Also of interest would be controlling unintended engagement of the output rotor stemming from leakage of working fluid from its reservoir into the operating chamber and the ability to provide a rapid responding shear fluid coupling.

SUMMARY

A motor vehicle power take off system for a motor vehicle engine includes a linkage from the engine for turning a rotatable input shaft. A viscous coupling including an operational chamber is connected to the rotatable input shaft. A rotatable output rotor and dependent output shaft are provided with the rotatable output rotor being located in the operational chamber. The operational chamber is substantially filled with a viscous working fluid for coupling the input rotor and the output rotor. A variable geometry impeller section is installed on the input rotor, the impeller section being configurable for varying the amount of input torque applied to the input rotor which is transferred to the working fluid. Both active and passive control schemes for the varying the geometry of the impeller section are provided.

DETAILED DESCRIPTION

Figure 1:
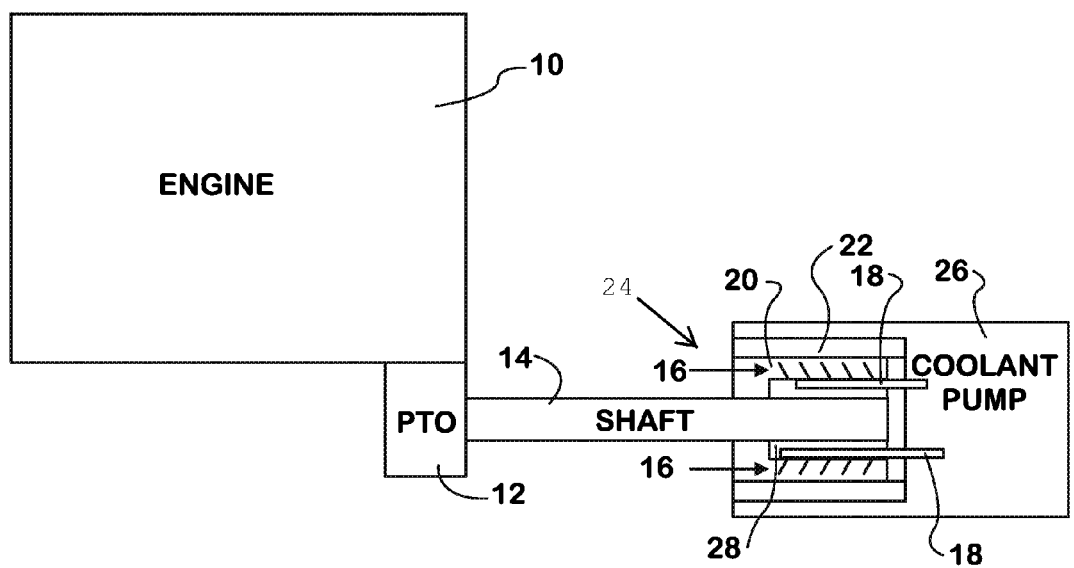
FIG. 1 is a high level schematic of a motor vehicle power take off system.
Figures 3A, 3B:
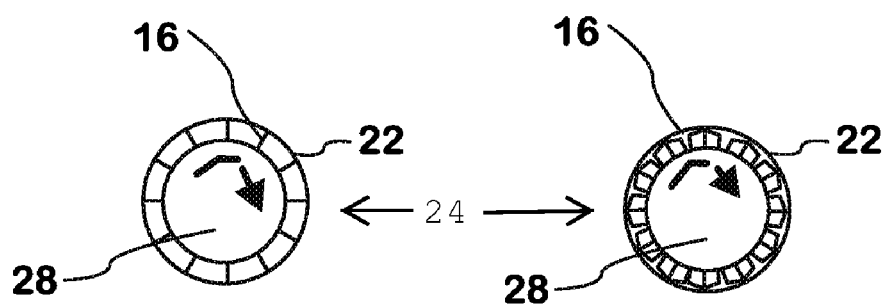
FIGS. 3A and B are end sections of the viscous coupling of FIG. 2.
Figure 2:
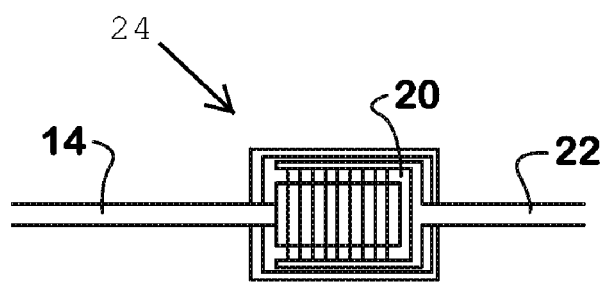
FIG. 2 is a side cross-sectional schematic of a viscous coupling used with the power take off system of FIG. 1.

Referring now to the figures and particularly to FIGS. 1, 2 and 3A-B, a viscous coupling 24 is described. Viscous coupling 24 provides for transmitting torque from (a vehicle) engine 10 to a parasitic device such as an engine coolant pump 26. The amount of torque transmitted depends upon demand for the operation of the parasitic device, which here would be engine temperature as indicated by the temperature of coolant circulating through the coolant pump 26. Control over torque transmission may be implemented either passively or actively. In the illustrated embodiment control is passive. Provision for a reservoir of working fluid is not required since the operating chamber may remained filled with torque transfer being varied by varying the geometry or alignment of impellers mounted to an input rotor in the viscous coupling.

Engine 10 is equipped with a conventional power take-off mechanism (PTO) 12 which turns a shaft 14. Shaft 14 is in turn connected into the viscous coupling 24 as the input shaft. Shaft 14 drives a cylindrical input rotor 28 of the viscous coupling 24. Input rotor 28 carries a plurality of variable pitch/geometry fins 16. Variable pitch fins 16 are mounted circumferentially about the input rotor 28, oriented outwardly from the exterior surface of the rotor. When turned across the direction of rotation of the input rotor their rotation circulates the working fluid/oil within operating chamber 20. Input rotor 28 is mounted within an output rotor 22 with the exterior surface of the input rotor opposite an interior surface of the output rotor. The variable pitch fins 16 extend from the surface of the input rotor 28 into near proximity with the interior surface of the output rotor 22 without physical contact between the fins and the interior surface of the output rotor. Both rotors are mounted for rotation. The fins 16 can be rotated from a substantially feathered or disengaged position (FIG. 3B) to an engaged position in which the fins are transverse to the tangent to the direction of rotation of the input rotor (as indicated by the arrows in FIGS. 3A-B) and working fluid is caused to circulate (shown in FIG. 3A) in operating chamber 20. In the fins' 16 feathered state the transmission of torque is minimized. As the fins 16 are progressively rotated across the direction of rotation of the input rotor 28 the transmission of torque increases.

The viscous coupling 24 embodiment of FIG. 1 does not include an active control system but relies instead on changes in shape of bi-metallic thermocouples 18 to reposition variable pitch fins 16. The bi-metallic thermocouples 18 are mounted in communication with coolant circulating through a coolant pump 26 and extend from the pump into input rotor 28 of the viscous coupling 24. By default, the fins 18, when "disengaged", maintain a minimum rotation of the output rotor 22 to assure that coolant circulates from the coolant pump 26 through the engine 10 and that thereby the temperature of the coolant accurately reflects engine temperature. This prevents local boiling and lockup of the coolant circulation system. It is easy to contemplate other passive control systems based, for example on temperature of the shear fluid. For example, a system is conceivable which would disengage the fins 18 with increasing temperature of the shear fluid to protect the operating characteristics of the fluid. Such a system could be used in combination with an active control system for a non-vital component to protect the coupling against damage.

Figure 4:
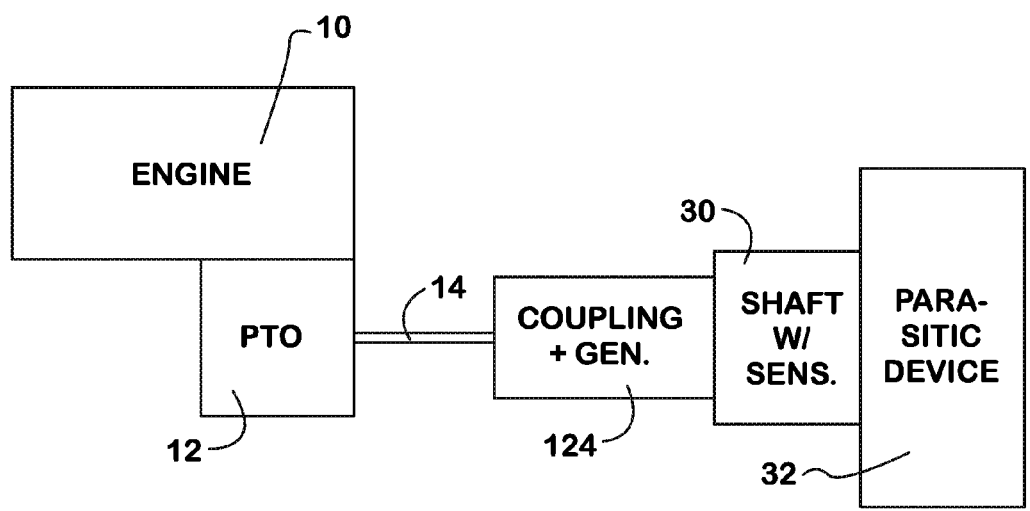
FIG. 4 is a schematic of a representative embodiment of a motor vehicle power take off system.

A generalized alternative embodiment is represented in FIG. 4, where engine 10 and PTO 12 are connected by a shaft 14 into a viscous coupling 124. Viscous coupling 124 is connected by an output shaft 30 to a parasitic device 32. A condition sensor may be associated with the coupling 124, the parasitic device 32 or the output shaft 30. Here for example an output shaft 30 with a sensor such as a strain gauge may be provided. A strain gauge could be applied to a shaft which was intended to be operated at constant output torque. Electrical power for the sensor and fin positioning could be provided by an electric generator built into one end of the input shaft 14 and a fixed point, such as the housing for the coupling 124. A controller powered from the same power source would function to orient the fins 18 to maintain a fixed (or selected) strain on the output shaft. Such a system would represent a mild, but self contained, active control arrangement that would not involve other vehicle control systems.

Figure 5:
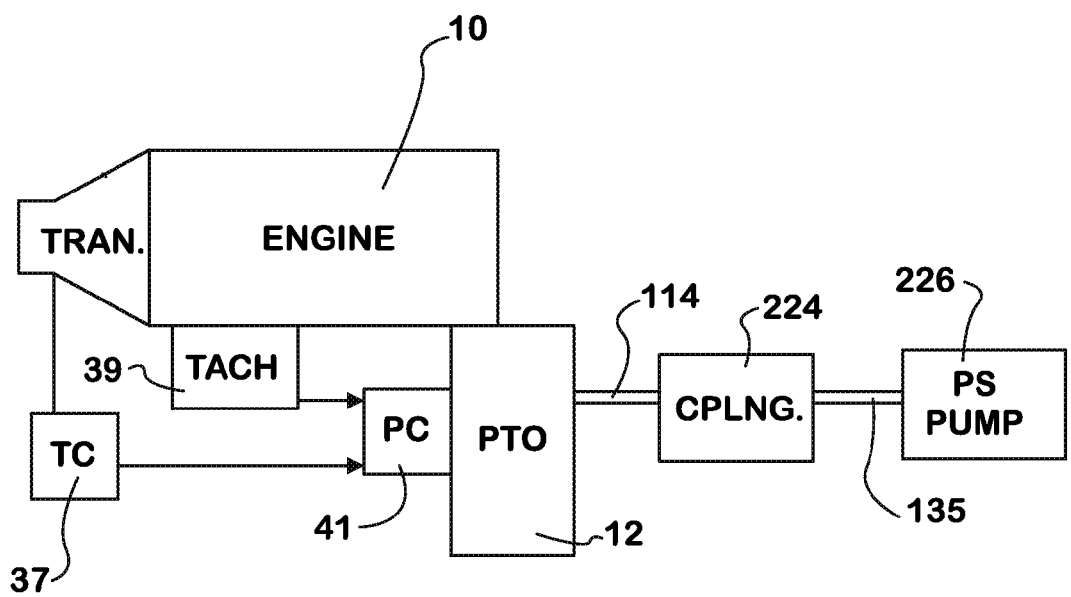
FIG. 5 is a schematic of a representative embodiment of a motor vehicle power take off system.

Fully active control arrangements typically vary with the application of the parasitic device to be powered. Referring to FIG. 5, provision may be made for active electronic control of the rotational positioning of fins 18 by use of a power take off controller 41. An example of how such a controller 41 would operate would be its use to position a cam actuator located through input shaft 114 for engaging cam followers in the viscous coupling 224 to rotate the fins 18 for progressively engaging or disengaging the coupling. Of course a number of control arrangements may be provided and these are not limited to a cam actuator, cam follower system. Controller 41 would provide for moving the cam actuator in response to operating condition(s) relevant to the particular application. FIG. 5 relates specifically to an arrangement for providing variable assist power steering. Variable boost is achieved by varying the pump speed of a power steering pump 226 driven by the output shaft 135 connected from the viscous coupling 224 to the power steering pump. Among possible variables that could be used for controlling boost are engine speed and vehicle speed. Typically less torque would be transferred through coupling 224 as vehicle speed increases and more torque would be transmitted as engine speed decreased, other variables being held equal. In essence the output torque required increases with decreasing vehicle speed, but the required proportion of available torque transmitted increases with decreasing engine speed. Given the transmission is changing gears, or even out of gear at times, these variables can be indicating opposite changes in fin 18 orientation and may even cancel. A transmission controller 37 coupled to a transmission could be used to generate a vehicle speed signal. An engine tachometer 39 connected to the engine 10 reports engine rotational speed. The PTO controller 41 develops a target output torque for the output shaft 135 at a given speed and varies transmitted torque based on changes in engine rotational speed. The fins are positioned to transfer the appropriate amount of torque to produce the target output shaft 135 speed for the power steering pump. Alternatively sets of variables are possible, for example vehicle speed and output shaft speed; power steering pump pressure and vehicle speed; or, vehicle speed and output shaft torque.

Figure 6:
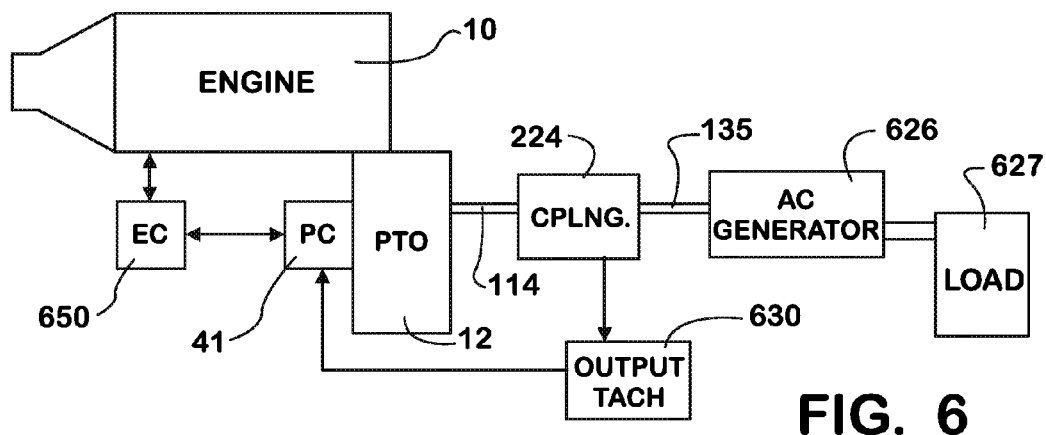
FIG. 6 is a schematic of a representative embodiment of a motor vehicle power take off system.

Embodiments directed toward applications for the generation of vehicle electrical power may be considered desirable, and an alternating current system is illustrated in FIG. 6. In FIG. 6 it is desirable to run an AC generator 626 at a constant speed notwithstanding changes in the load 627 supported by the generator. A tachometer 630 is illustrated connected to viscous coupling 224 which generates a rotational velocity signal for the output shaft 135. In order to maintain a constant frequency AC output from AC generator 626 it is essential to maintain constant the rotation velocity of shaft 135. Alternatively, if variable frequency alternating current were desired it would be a simple matter to vary the target speed of the shaft. For example, an alternating current electrical system capable of operating at 50, 60 or 400 Hertz may be desired. In any case the tachometer signal from tachometer 630 is provided as a feedback signal to controller 41. Controller 41 may also receive engine operating variable signals from an engine controller 650 and may refer requests for increases in power from engine 10 to the EC 650. For example, if coupling 224 is already set for maximum torque transfer and output frequency is falling the controller 41 can call on the engine controller 650 to increase engine output.

Figure 7:
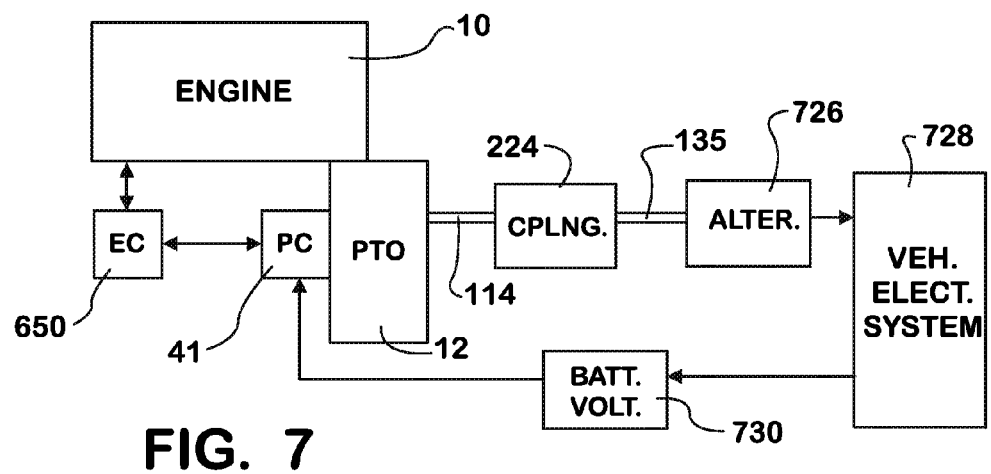
FIG. 7 is a schematic of a representative embodiment of a motor vehicle power take off system.

FIG. 7 as illustrated describes an embodiment suited for vehicle operations such as maintaining air brake system pressure or vehicle electrical system battery charge. The specific illustration shows its use with an alternator 726, a vehicle electrical system 728 and a battery voltage sensor 730, however, an air pump/compressor could readily be substituted for alternator 726, an air storage and brake system for electrical system 728 and a storage tank pressure gauge for voltage sensor 730. It should be recognized that "battery voltage" is a proxy for the state of charge of a vehicle battery and may not reflect the actual state of charge of a battery, particularly a conventional lead-acid battery. Essentially the control arrangements are physically quite similar to the embodiment of FIG. 5 except the source of the feedback control signal has changed. The use made of that variable also changes. Where battery voltage is the controlling variable it is expected that a minimum battery voltage must be maintained and that the system will run transferring maximum torque at low voltages to speed recharge of a system battery during periods when the battery can accept high input currents. Charging current is reduced to a trickle as the target voltage is approached. Keeping air pressure in a tank in a target range may make use of a different regimen, since there the air tank will not be damaged by high input rates, although there may be an interest in not overloading the engine.

Figure 8:
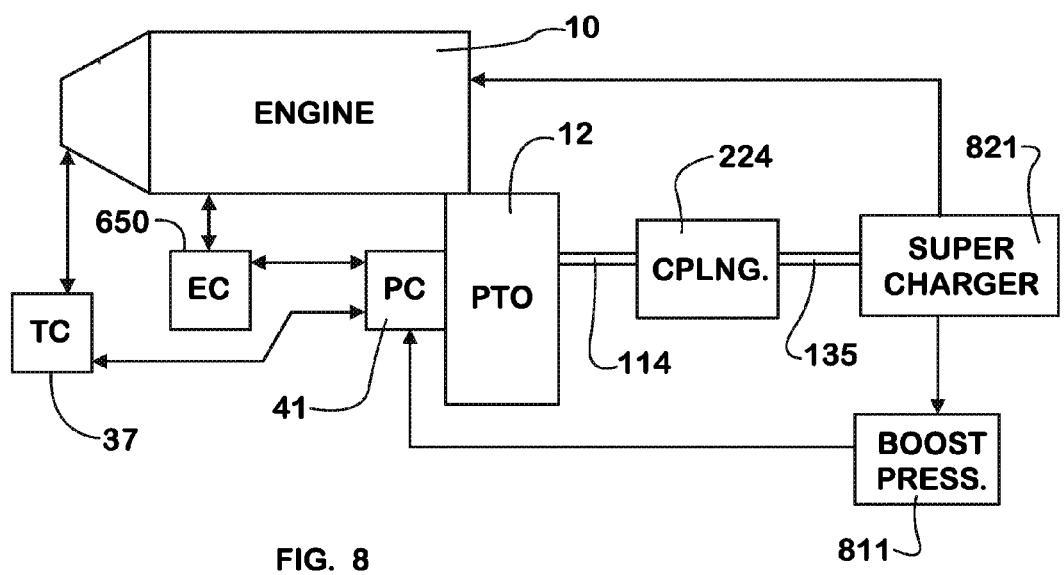
FIG. 8 is a control schematic for still another embodiment of a motor vehicle power take off system.

Referring to FIG. 8, a control schematic for an embodiment relating to supercharging of an engine 10 is illustrated. The arrangements are similar to those for the embodiment of FIG. 7, with the substitution of a supercharger 821 for alternator 726. A boost pressure sensor 811 provides a boost pressure signal as a feedback signal to the PTO controller (PC) 41. Providing boost to an engine 10 induction system presents different control issues than does maintaining air pressure for a pneumatic brake system. Superchargers, while providing quicker response times than turbochargers and providing boost at low engine RPMs when such boost is most needed, have suffered in comparison with turbochargers because they impose a parasitic loss on an engine while a turbocharger, in substantial part, operates on energy recaptured from a vehicle exhaust system. The parasitic loss represented by the supercharger has often been imposed whether or not boost was required. A system which allows control over the amount of torque transmitted from an engine drive system to a supercharger allows engine and transmission control (for automatic transmission equipped vehicles) to be integrated with control over the supercharger and for the supercharger to be disengaged when not needed. In the present embodiment coupling 224 can be disengaged at highway cruise to eliminate the parasitic losses imposed by supercharger 821. At low engine RPMs and high throttle settings, full engagement of coupling 224 can be used to achieve the desired boost. "Desired boost" may be calculated by engine controller 650 based on engine and transmission operating variables, limited only by how much torque can be transmitted through coupling 224. PC 41 than uses the pressure boost feedback signal from sensor 811 to control coupling 224 to achieve the target input.

What is claimed is:

1. A fluid coupling comprising:
   an operating chamber;
   an input rotor mounted for rotation in the operating chamber;
   an output rotor mounted for rotation in the operating chamber;
   a working fluid substantially filling the operating chamber for coupling torque from the input rotor to the output rotor;
   a configurable impeller section mounted for rotation with the input rotor, the impeller section allowing a selected portion of rotating energy of the input rotor to be transferred to the working fluid, wherein the configurable impeller section further comprises a plurality of rotatable fins mounted around an exterior cylindrical surface of the input rotor; and
   a thermocouple communicating with the input rotor and responsive to temperature of the working fluid for positioning the plurality of rotatable fins.

2. A fluid coupling as set forth in claim 1, further comprising:
   a controller responsive to selected input signals for operating the configurable impeller section.

3. A fluid coupling as set forth in claim 1, further comprising:
   a controller responsive to selected input signals for positioning the plurality of rotatable fins.

* * * * *